United States Patent Office 3,297,897
Patented Jan. 10, 1967

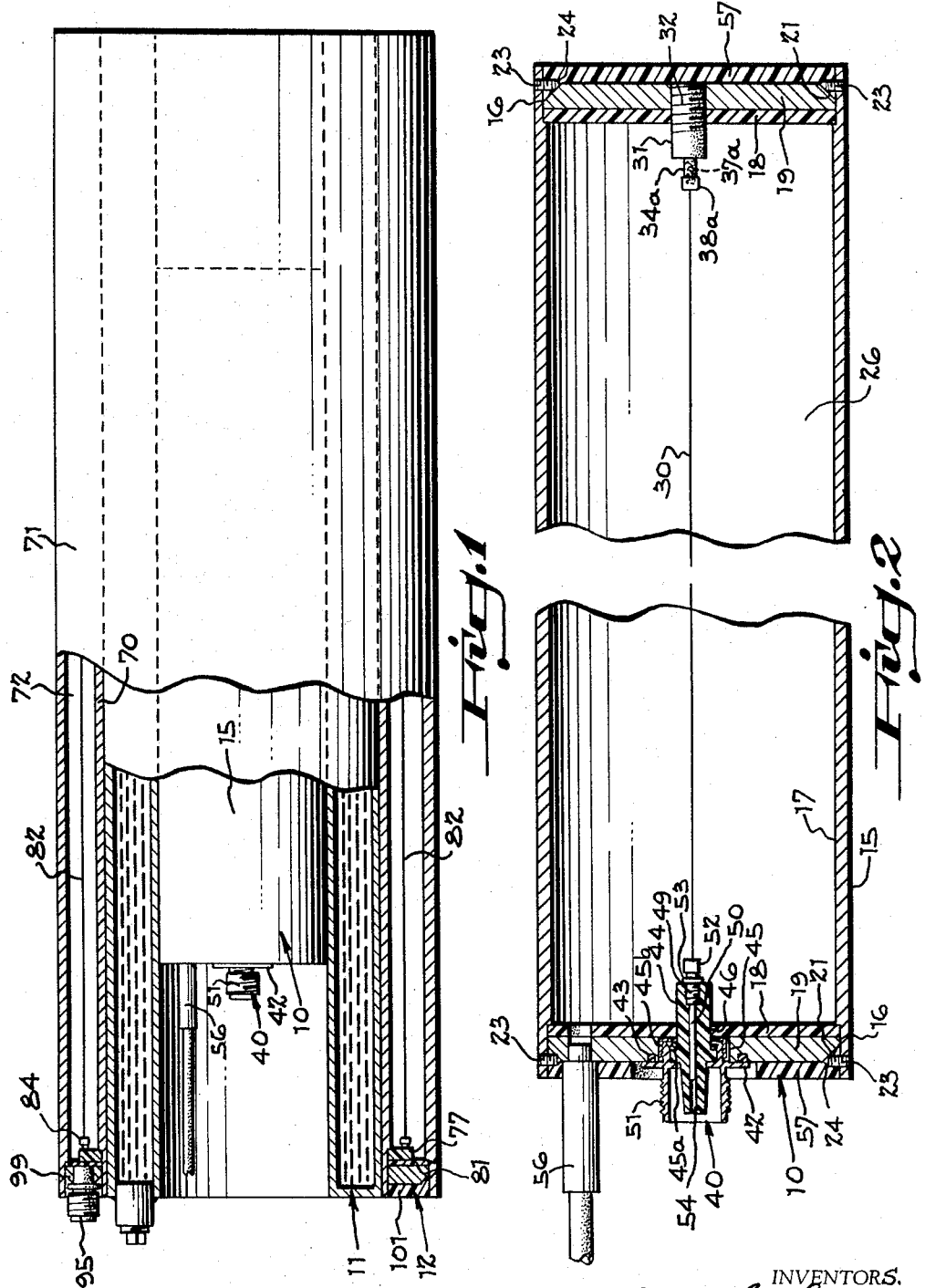

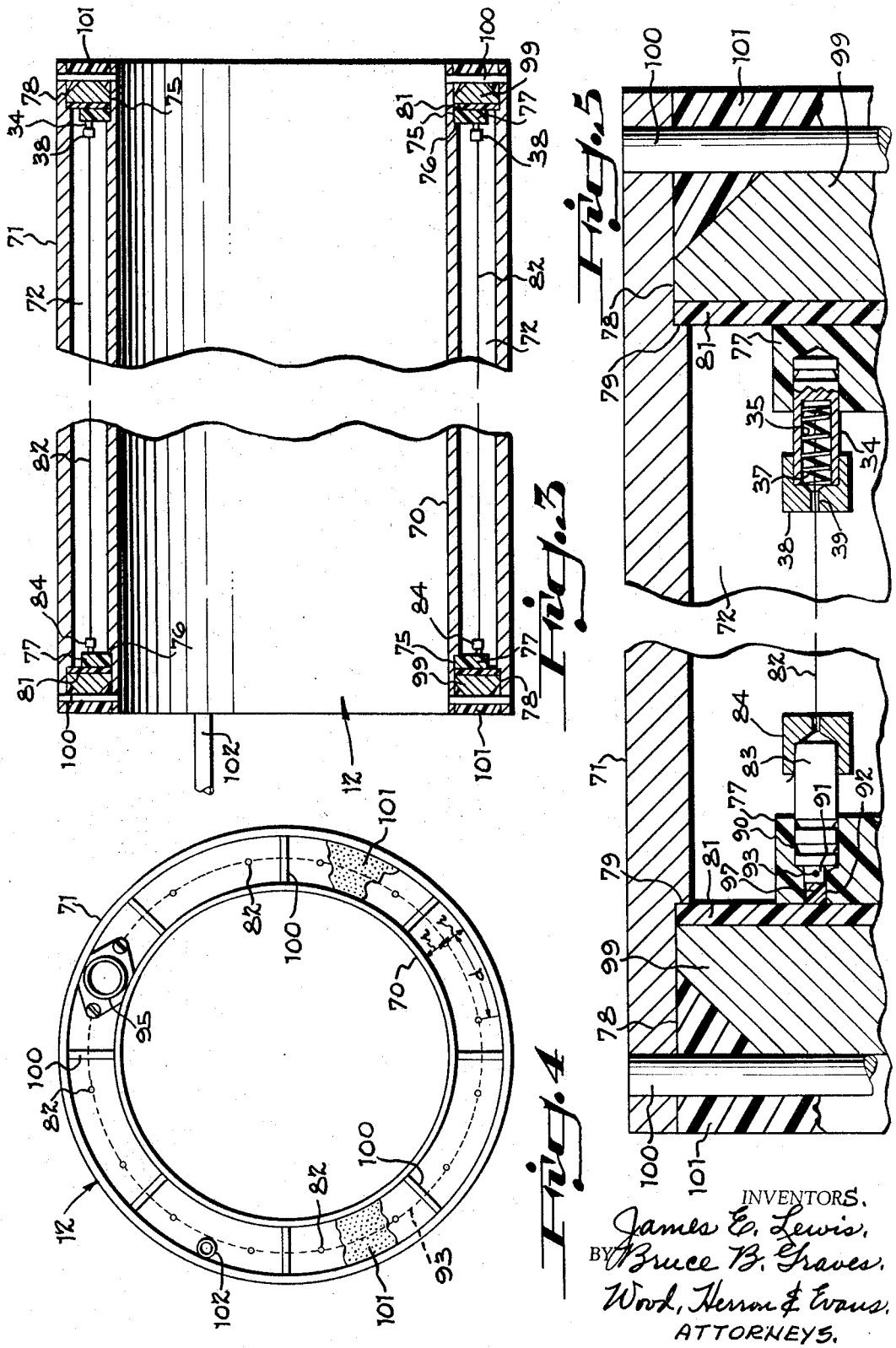

3,297,897
LOW LEVEL GAS PROPORTIONAL COUNTER CONSTRUCTION
James E. Lewis and Bruce B. Graves, Louisville, Ky., assignors, by mesne assignments, to Radiochemistry, Inc., Louisville, Ky., a corporation of Delaware
Filed Mar. 21, 1963, Ser. No. 266,901
5 Claims. (Cl. 313—93)

This invention relates to improvements in low level gas proportional counters.

Low level counters are used to detect and measure very small quantities of radioactivity. As a typical illustration, low level counters are employed in radioactive dating techniques, wherein a carbon-containing organic material is dated by measurement of its proportional content of the radioactive carbon-14 isotope. Such counters also find use in tracing experiments wherein quantities of other radioactively "tagged" compounds are determined.

Low level counters as a group are distinguished from other types of radioactivity measuring devices by the extremely dilute radioisotope concentrations which they are adapted to measure. To be effective, a low level counter must be capable of measuring down to a few disintegrations per minute of weak beta particle emitters, such as carbon-14.

In the so-called gas proportional type of low level counters, to which this invention specifically relates, the radioactive sample is introduced into a sample counter in gaseous form, as a part of the counting gas. Counting gases which have been used for this purpose include methane, which is especially suitable in carbon-14 dating techniques, ethane, carbon dioxide, and acetylene, among others.

The sample counter is essentially a Geiger tube in the form of a hollow copper tube which is connected to the cathode of a high voltage power supply. A fine wire, usually tungsten, is stretched axially in the tube and is connected through one end of the tube by a high voltage insulator to the anode or positive side of the power supply. The potential difference impressed between the wire and the tube is usually in the approximate range of 1000 to 10,000 volts D.C., depending upon tube construction and the particular type and pressure of counting gas being used, and is adjusted so that the tube will operate in the proportional "beta plateau" region. The tube is evacuated prior to the introduction of the gas sample into it, to remove atmospheric contamination, and may be charged to superatmospheric pressure with the gaseous sample, depending on the size of the sample in relation to the volume of the counting chamber defined within the tube. The tube responds to nuclear disintegrations, which may occure within the sample only once or twice a minute, by a pulse in the potential between the wire and the tube. As is well known, the number of such counts arising from the sample in a given period is a measure of the concentration of the radioisotope in the gas sample.

Besides responding to disintegrations arising from the sample, the sample counter is also actuated by spurious or externally caused radiation passing through the space between the wall and the tube, which may result from cosmic rays, residual background radiation, or other sources. Provisions are therefore made to reduce, insofar as possible, such spurious or external disintegrations which do not arise from the sample in the counter, and to differentiate externally caused counts from disintegrations arising from the sample. This is done by enclosing the counter within massive shielding to reduce external radiation, and by making both the counter and shielding from materials of low residual radioactivity. Radiation not stopped by the shielding, consisting mainly of the high energy components of cosmic radiation, is detected and electronically distinguished by a so-called anti-coincidence counter mounted around the sample counter inside the massive shielding. The anti-coincidence counter is isolated from, and does not respond to, disintegrations of the gas sample being counted, but is responsive to cosmic mesons and showers, which, in passing through the anti-coincidence counter may, depending on their angle of incidence, also pass through the sample counter and thereby cause a false count in it. Counts detected by the anti-coincidence counter are electronically placed in anti-coincidence with counts registered in the sample counter: thus, counts occuring nearly simultaneously in both the anti-coincidence counter and the sample counter, as caused by external radiation, are not registered. During the short period of time in which the sample counter is responding to an externally caused disintegration, which response time is usually in the neighborhood of 1 to 10 micro seconds, the sample counter is not responsive to disintegrations of the sample, but by reason of the small number of sample disintegrations per minute the loss of counting detection is not serious. More serious, however, is the inaccuracy which has previously resulted from cosmic radiation passing through the anti-coincidence counter to which that counter is non-responsive.

Usually an annular mercury shield is placed between the sample counter and the surrounding anti-coincidence counter. Both the anti-coincidence counter and sample counter are usually further encased in paraffin and boric acid neutron shielding, inside a massive outer shield of lead and/or iron which reduces external gamma radiation.

The sample counter and anti-coincidence counter are connected through amplifiers to scaling and counting electronics for differentiating counts registered by the anti-coincidence counter, and for recording the net count from the sample counter.

Against this background, it has been an objective of this invention, in one aspect, to provide an improved construction for a low level gas sample counter whereby the counting efficiency and operation of the counter will be significantly improved in relation to past constructions.

In another aspect, it has been an object of this invention to provide an improved construction for an anti-coincidence counter whereby more complete detection of cosmic or externally caused radiation will be achieved, so that more accurate differentiation of externally caused radiation can be established.

The various aspects of this invention and its objectives can best be further described in relation to the accompanying drawings, in which:

FIGURE 1 is a longitudinal elevation, partly in section, of a preferred embodiment of a sample counter and anti-coincidence counter including the principles of this invention, as mounted for use, showing a conventional mercury shield between the sample counter and anti-coincidence counter;

FIGURE 2 is a longitudinal section, partly broken away, through the sample counter;

FIGURE 3 is a longitudinal section, partly broken away, through the anti-coincidence counter;

FIGURE 4 is an end view, partly broken away, of the anti-coincidence counter illustrated in FIGURE 3; and FIGURE 5 is an enlarged longitudinal section, partly broken away, of a portion of the anti-coincidence counter shown in FIGURE 3.

The low level gas counter assembly shown in FIGURE 1 includes a cylindrical sample counter, designated by 10, which is surrounded by an annular tank 11 containing mercury, which in turn is surrounded by an annular anti-coincidence counter 12. In use, the assembly is surrounded by additional shielding which may be conventional and which is not shown. The use of a mercury shield between the sample counter 10 and the anti-coincidence counter 12 is conventional, and the mercury shield itself does not comprise a part of this invention.

It will be noted that the axial dimension of the sample counter 10 is substantially less than that of the mercury shield 11 and that of the anti-coincidence counter 12. The greater lengths of the shield and anti-coincidence counter reduce external radiation passing endwise through the sample counter without first having passed through the anti-coincidence counter. Since most (about 90%) of the cosmic radiation occurs within 70° of vertical, only the very small proportion of cosmic radiation which is nearly axial in direction can pass through the sample counter without first passing through the anti-coincidence ring 12.

As best shown in FIGURE 2, the sample counter 10 includes a tubular body member or shell 15 which is preferably made of high purity copper; copper possesses excellent electrical conductivity together with very low residual radioactivity. The length of the tubular body 15 is several times its diameter, and preferably is of the order of 5 to 8 times its diameter. The greater the length/width ratio of the sample counter the better its counting efficiency will be.

At each end the body member 15 is configured with an internal groove 16 which extends annularly around its inside surface 17 and which defines a shoulder therein. An electrically non-conductive planar disc or filler 18, preferably of polytetrafluoroethylene or a material having equivalent insulating properties, is fitted into the tube 15 at each end thereof, abutting the shoulder or side of the groove 16. Polytetrafluoroethylene is preferred for the fillers 18 because of its excellent electrical insulating properties, good qualities under vacuum, and cold flow characteristics enabling a tight seal to be obtained. The fillers 18, 18 define the internal end surfaces of the counting chamber 26 within the tube 15.

The use of a high voltage insulative material for the inside end wall members 18, 18 substantially improves the counting efficiency of the tube, because the end walls then do not charge to the potential of the tube 15 and apparently do not alter the configuration of the electric field around the anode wire to the same extent as a conductive end plate; in any event, there is less "dead volume" adjacent the ends of the tube, so that effective counting volume is increased.

Axially outwardly of the non-conductive fillers 18 at each end of the sample counter are circular disc-like end plates 19, 19, preferably made of copper, which are fitted snugly in the grooves 16, 16 against the fillers 18, 18. Each end plate 19 is chamfered, as at 21, around its outer peripheral edge. Screws 23 extend through the body member 15 at circumferentially spaced positions, and each screw 23 has a tapered or chamfered end 24 which bears against the angulated surface 21 of the end plates 19, 19 to hold the latter in facial engagement with the fillers 18, 18. By these means tight, uniform engagement of the fillers 18, 18 against the sides of the grooves 16, 16 is obtained.

A wire anode 30 extends axially in chamber 26, between the ends of the sample counter. This wire 30 is of fine gauge tungsten, platinum, or a similar material. We prefer to use tungsten of 1 to 0.5 mil diameter. This wire 30 is connected to a high voltage connector, which in use is connected to the positive terminal of a source of potential. The tube 15 is connected to the negative side of the voltage source.

At its right end in FIGURE 2, the wire 30 is connected to a non-conductive mounting 31, preferably a rod of polytetrafluoroethylene, which is secured to the end wall of the sample counter as by threads 32 in an axial bore in the filler 18 and end plate 19. From an operational standpoint, the mounting 31 need not extend outwardly of the end of the counter, but in order to facilitate assembly it may be received and sealed in an outwardly projecting threaded sleeve, not shown, whereby it can be positioned axially in assembly.

At its inner end the insulating mounting 31 has an axial bore and receives a pin 34a which is press-fitted in this bore. As will be explained, pins of similar configuration, designated as 34, are used to mount the anode wires of the anti-coincidence counter 12. An enlarged view of one such pin 34 as mounted in the anti-coincidence counter is seen in FIGURE 5, and the details of pin 34a and its associated parts are described in reference to pin 34.

As shown in FIGURE 5, the pin 34 has an axial bore 35. A spring 37 is disposed in bore 35 of pin 34, and the end of a wire 82 is secured to an in-turned end of this spring 37. A cap 38 is press-fitted onto the end of pin 34 and holds the spring in bore 35. Cap 38 has a central bore 39 through which the wire 82 extends. Spring 37 maintains tension on wire 82.

Similarly, as shown in FIGURE 2 the pin 34a of the sample counter has an axial bore into which the wire 30 extends. A spring 37a is disposed in the bore of pin 34a, and the end of wire 30 is secured to the far end of spring 37a. A cap 38a is press-fitted onto the end of pin 34a and holds the spring in the bore. Cap 38a has a central bore through which the wire 30 extends. Spring 37a maintains tension on wire 30, holding it in axial position. Deviation of wire 30 from axial position is detrimental to counting efficiency.

At its opposite end, wire 30 of the sample counter is connected to an external high voltage connector generally designated by 40, whereby connection can be made to a source of operating potential through a plug-in socket. The connector 40 includes a metal base 42 which is in electrical connection with the end plate 19 and which extends loosely into a bore 45 in the end plate 19. A non-conductive plug or shouldered rod 44, preferably made of polytetrafluoroethylene, projects from the base 42 of the connector into the tube and is closely fitted in a bore 46 in filler 18. This plug 44 is sealed to the connector base 42 by an O-ring 45a which is compressed by a collar 45b threaded onto the base 42 in bore 45. Base 42 is sealed to the end plate 19 by an O-ring 43 which is received in an annular groove in the end plate and which is compressed therein by the base. An elongated conductive pin 50, preferably made of brass, is threaded (as at 49) into an axial bore in plug 44. At its outer end, this pin 50 has fingers 54 formed on it for engaging the pin of a male connector, and base 42 includes a threaded portion 51 for making the other connection. A shoulder 53 is formed on pin 50 and abuts the inner end of plug 44, making a tight seal. The wire 30 passes through a central bore in a cap 52, which is identical to the cap 38 previously described, and cap 52 is press-fitted onto the end of pin 50. Wire 30 is pinched between the cap 52 and the pin so that it is secured both mechanically and electrically, in the manner that wire 82 is secured in FIGURE 5. The tip or inside end of plug 44 preferably projects about one-half inch but no more into chamber 26, as measured from the inner surface of filler 18; the same is true of wire mounting 31 at the other end of tube 15.

A connection for admitting a counting gas to the chamber 26 is providing through the end wall 19 and filler 18 of the sample counter, at a radial position which is close to the body 15. This gas connection 56 is fitted and sealed to a bore in the end cap 19 and does not project into the chamber 26 beyond the filler 18. Externally, each end of the counter is sealed with a potting compound or hardened plastic resin, preferably an epoxy, as designated at 57, 57.

The counting characteristics of previous sample counters have tended to vary in an unpredictable manner from counter to counter, even where the counters were of a given construction. That is, one counter of a given type might operate satisfactorily in a plateau with a potential of say, 6,000 volts at a certain gas pressure, while another counter of the same type would not, but would require a different gas pressure or voltage. The reasons for these variations are not fully understood. We have found, however, that the construction shown and described herein provides counting characteristics which are remarkably constant from counter to counter, and which enable counters of different sizes and shapes to be built which will possess the same counting characteristics as counters of other sizes based upon this construction. The operation of the present counter is especially good in comparison to past constructions when charged with a counting gas at superatmospheric pressure, in that it enables a plateau to be attained at relatively lower operating voltages for a given gas.

As stated, the high voltage connectors and mounts 44 and 31 extend no more than about 0.5 inch into chamber 26 from the inner surfaces of fillers 18, 18. In other constructions, utilizing a conductive material for the interior end walls, it is necessary to extend the high voltage mounts into the tube a greater distance, typically about 1.5 inch, to insure against arcing from the wire to the end wall. This has caused an undesirably large "dead" counting area around the high voltage connections at each end of the wire in prior constructions, and this dead area has reduced effective counting efficiency. We have found that in our construction dead area is reduced significantly and effective counting efficiency is thereby improved.

Heretofore, anti-coincidence counters have usually comprised a plurality of separate, axially parallel, circularly arranged tubular Geiger counters stationed around the sample counter. In other instances, a plurality of wires have been mounted in a common annular envelope, but each wire was contained in a partitioned or screened compartment, each of which was in effect a single Geiger tube. In all such configurations, even though the anti-coincidence counter extends 360° around the sample counter, there has inevitably been a definite, nonnegligible possibility of undetected external or cosmic radiation passing in the tangential direction through the metal walls or partitions between the individual tubes, into the sample counter, without being placed in anti-coincidence with the count in the sample counter. Spurious and incorrect counts are thereby recorded in the measurement. The desirability of overcoming this inaccuracy by eliminating such partitions or walls has long been apparent, but it had been thought impossible to use a plurality of anode wires in a single envelope without walls between them, for the reason that in all previous constructions the counting efficiency of such arrangements was so low that the counter was of no real utility for making accurate anti-coincidence counts.

We have discovered a particular configuration or anti-coincidence counter geometry whereby a plurality of anode wires may be contained in a common annular envelope without walls or partitions of any type between them, yet which demonstrates a counting efficiency far superior to that of past arrangements, and which will respond to cosmic radiation passing through the envelope virtually without regard to its angular direction.

The anti-coincidence counter 12 is shown in detail in FIGURES 3, 4 and 5. This counter includes a tubular, electrically conductive inner shell or body member 70 and a concentric, tubular, electrically conductive outer shell 71 which define an annular space 72 between them. The inside diameter of the inner shell 70 is slightly greater than the outside diameter of the mercury shield 11 so that the shield 11 can be slipped within the anti-coincidence counter, as shown in FIGURE 1.

The outer surface of the inner tubular member 70 of the anti-coincidence counter is provided with a groove 75 at each end, and the sides of the grooves 75, 75 defines shoulders 76, 76 extending annular around the tube 70.

At each end of tube 70 an annular, insulative support ring, preferably made of polytetrafluoroethylene resin or a similar electrically insulating material, is seated against the shoulder 76. These support rings are designated in the drawings by 77, 77. The rings 77, 77 are spaced from the outer tube 71 and do not engage its surface in order to permit tube 71 to be slipped over the inner tube 70 after the wires have been mounted between the rings 77, 77.

The inner surface of the outer tube 71 is configurated at each end with a groove 78, and the sides of grooves 78, 78 define shoulders 79, 79 which are axially outwardly of the shoulders 76, 76. An insulative shield 81 is fitted against each shoulder 79, and abuts the outer surface of the support ring 77, holding the latter against the shoulder 76. The shields 81, 81 are preferably also made of polytetrafluoroethylene.

A plurality of anode wires 82 are mounted in parallel relation with the common axes of tubes 70 and 71, each wire 82 being centered radially in the space 72 between the tubes and being spaced from the other wires as shown in FIGURES 4, in a specific relation to be described. At one end, i.e. at the right end in FIGURES 3 and 5, each wire 82 is resiliently mounted to a pin 34 which is secured to the support ring 77. As previously explained, the wire 82 passes through a bore 39 in a cap 38 and is fastened to a spring 37 in a bore 35 within pin 34, and cap 38 is press-fitted onto the end of pin 34. At the other end, i.e. the left end in FIGURES 3 and 5, each wire 82 is connected electrically and secured mechanically to a pin 83. The pin 83 is electrically conductive, and is suitably made of brass. The wire extends through an axial bore in a cap 84, and is gripped between the inner surface of the cap 84 and the pin 83. The end of the pin 83 is press-fitted into a bore 90 in the support ring 77, and a protruding stud 91 of the pin projects into an annular groove 92 formed in the outer face of the support ring 77. A shorting wire 93 (indicated by the dashed lines in FIGURE 4), extends through a cross-bore in the stud 91 of each pin 50. The stud 91 grips the wire 93 securely and thereby electrically connects each pin 83 and wire 82 to wire 93. The shorting wire 93 extends around the anti-coincidence counter and is electrically connected to the central pin of a high voltage connector 95 which may be similar to the connector 40 of the sample counter. The conductive tubes 70 and 71 are connected to the base of connector 95, so that the wires 82 are electrically insulated from the tubes 70 and 71. An insulative plastic rod or ring 97 is press-fitted into the groove 92 outwardly of the studs 91, thereby enclosing the wire 93.

We have found that the counting efficiency of an anti-coincidence counter having a plurality of anode wires within a common annular conductive housing, without walls between the wires, depends critically upon the geometry and arrangement of the wires. Specifically, we have determined that the radial dimension from each wire to the walls defining the chamber 72, i.e. to the inner wall of the outer tube 71 and to the outer wall of the inner tube 70, which dimension is indicated by "$r$" in FIGURE 4, must bear a certain critical ratio to the circumferential distance between each pair of adjoining wires, as indicated by "$d$" in FIGURE 4: the curved or circumferential distance $d$ between each pair of wires should be approximately twice the radial dimension $r$ from the wire to the wall.

We know of no theoretical explanation for the criticality of this relationship, although it is believed on geometrical grounds that the electrostatic field surrounding each wire in an anti-coincidence counter wherein the ratio $d:r$ equals about 2 most nearly approaches the field around a single wire in a conventional tubular Geiger counter. With reference to FIGURE 4, it will be seen that each wire 82 is mounted in accordance with this principle.

An annular or ring-like end plate 99 of copper is seated between the grooves 75 and 78 at each end of the tubes 70 and 71. These end plates 99 are secured in place by a plurality of radially extending pins 100 between the tubes 70 and 71. The space between tubes 70 and 71 externally of the end plates 99 is filled with a plastic potting composition, preferably an epoxy resin, designated by 101 in the drawings, which is effective to make the counter gas tight to internal pressure.

Provision for admitting a counting gas into the chamber 72 is made by a gas tight connection 102, positioned closely adjacent the outer tube 71 equidistant from the adjacent pair of wires 82, 82.

It will be noted that in the present anti-coincidence counter construction, as in the sample counter, the minimum distance over the internal end surfaces from any wire 82 to either tube 70 or 71 or to any surface electrically connected to the tubes, is equal to or greater than the straight line radial distance to the tubes. This relationship reduces arcing and improves counting efficiency.

Suitable electronic circuitry for use with the sample counter and anti-coincidence ring are described in The Review of Scientific Instruments, vol. 26, No. 12, December 1955, at pages 1137–1140.

Having described our invention, what we claim is:

1. An anti-coincidence counter comprising,
concentric first and second electrically conductive tubes of different diameters defining an annular cylindrical counting chamber between them, the radial dimension of said chamber between said first and second tubes being expressed by $2r$,
high voltage insulator means mounting a plurality of wires parallel to the axes of said tubes in said chamber,
the radial spacing of each of said wires from the surface of each tube being substantially equal to $r$ and the circumferential distance between each pair of adjacent wires being substantially equal to $2r$, and the circumferential distance between each member of said pair of wires being substantially equal to $2r$,
said high voltage insulator means comprising, a non-conductive ring at each end of said chamber between said tubes and mounting means securing said wires between said rings,
a shorting wire in one ring connecting the ends of said wires,
a conductive annular end cap outwardly of each ring and electrically connecting said tubes,
means holding each end cap against its respective ring,
a potting compound sealing said end cap between said tubes,
and external means for connecting a source of potential across said tubes and said wires.

2. An anti-coincidence counter comprising,
concentric first and second electrically conductive tubes of different diameters defining an annular counting chamber between them, the radial dimension of said chamber between said first and second tubes being designated by $2r$,
high voltage insulator means mounting a plurality of fine wire anodes in said chamber parallel to the axes of said tubes,
the radial spacing of each of said wires from the surface of each tube being substantially equal to $r$ and the circumferential distance between each pair of wires being substantially equal to $2r$, and the circumferential distance between each member of said pair of wires being substantially equal to $2r$,
said high voltage insulator means comprising, a non-conductive ring at each end of said chamber and mounting means securing said wires to said ring, said mounting means including elastic means for holding said wires in tension in said chamber,
a shorting wire connecting the ends of said wires,
a conductive annular end cap outwardly of each ring and electrically connecting said tubes,
means holding each end cap between said tubes,
and external means for connecting a source of potential across said tubes and said wires.

3. A low level gas counter comprising,
a cylindrical, electrically conductive tube,
means defining an annular internal shoulder at each end of said tube,
a non-conductive disc seated against the shoulder at each end of said tube,
a conductive end cap outward of the non-conductive disc at each end of said tube and facially engaging the disc,
means holding each end cap against the adjacent disc,
a potting compound sealing said end caps to said tube,
a high voltage connector extending through the end cap and disc at one end of said tube, said connector including a non-conductive rod extending into the interior of said tube,
a fine wire mounted axially at the inner end of said rod and connected electrically through the interior of said rod to said high voltage connector,
wire mounting means at the other end of said tube, said wire mounting means including a non-conductive rod to which said wire is secured, projecting into the interior of said tube from said non-conductive disc,
elastic means applying axial tension to said wire,
and means for admitting a counting gas to the interior of said tube.

4. The counter of claim 3 wherein said non-conductive discs and non-conductive rods are made of polytetrafluoroethylene.

5. A low level gas counter comprising,
a cylindrical, electrically conductive tube,
means defining an annular internal shoulder at each end of said tube,
a non-conductive disc seated against the shoulder at each end of said tube,
a conductive end cap outward of the non-conductive disc at each end of said tube and facially engaging the disc,
means holding each end cap against the adjacent disc,
a potting compound sealing said end caps to said tube,
a high voltage connector extending through the end cap and disc at one end of said tube, said connector including a non-conductive rod extending not more than about 0.5 inch into the interior of said tube,
a fine wire mounted axially at the inner end of said rod and connected electrically through the interior of said rod to said high voltage connector,
wire mounting means at the other end of said tube, said wire mounting means including a non-conductive rod projecting into the interior of said tube from said non-conductive disc not more than about 0.5 inch and including elastic means applying axial tension to said wire,
and means for admitting a counting gas to the interior of said tube.

References Cited by the Examiner

UNITED STATES PATENTS

| 2,443,731 | 6/1948 | Herzog et al. | 313—93 X |
| 2,535,066 | 12/1950 | Herzog | 250—83.6 |
| 2,886,713 | 5/1959 | Fearon | 250—83.6 |
| 2,957,084 | 10/1960 | Marr et al. | 250—83.6 |

FOREIGN PATENTS

| 927,040 | 10/1947 | France. |

JAMES W. LAWRENCE, *Primary Examiner.*

R. SEGAL, *Assistant Examiner.*